US012659758B2

(12) United States Patent
Ryu

(10) Patent No.: US 12,659,758 B2
(45) Date of Patent: Jun. 16, 2026

(54) INDICATING BEAM MAINTENANCE REFERENCE SIGNAL RESOURCES

(71) Applicant: QUALCOMM Incorporated, San Diego, CA (US)

(72) Inventor: Jung Ho Ryu, Fort Lee, NJ (US)

(73) Assignee: Qualcomm Incorporated, San Diego, CA (US)

( * ) Notice: Subject to any disclaimer, the term of this patent is extended or adjusted under 35 U.S.C. 154(b) by 302 days.

(21) Appl. No.: 18/470,938

(22) Filed: Sep. 20, 2023

(65) Prior Publication Data

US 2025/0097724 A1      Mar. 20, 2025

(51) Int. Cl.
H04L 5/00          (2006.01)
H04W 16/28         (2009.01)

(52) U.S. Cl.
CPC ........... H04W 16/28 (2013.01); H04L 5/0051 (2013.01)

(58) Field of Classification Search
CPC ..... H04W 16/28; H04W 72/25; H04W 72/40; H04L 5/0051; H04L 5/0048; H04B 7/0695
See application file for complete search history.

(56) References Cited

U.S. PATENT DOCUMENTS

2023/0224867 A1 *   7/2023   Wu ....................... H04L 1/1812
                                                  370/329

FOREIGN PATENT DOCUMENTS

WO     WO-2024071376 A1 *   4/2024   ........... H04B 7/0695
WO     WO-2024233837 A1 *  11/2024   ........... H04W 72/25

* cited by examiner

*Primary Examiner* — Thai Nguyen
(74) *Attorney, Agent, or Firm* — Harrity & Harrity, LLP

(57)          ABSTRACT
Various aspects of the present disclosure generally relate to wireless communication. In some aspects, a first user equipment (UE) may communicate an inter-UE coordination (IUC) message with a second UE, the IUC message comprising first beam maintenance reference signal (BM RS) information. The UE may transmit a BM RS using, based on the first BM RS information, a set of BM RS resources. Numerous other aspects are described.

30 Claims, 10 Drawing Sheets

500

600

602

604

| Field name | Field size (in bits) |
|---|---|
| Providing/ requesting indicator | 1 |
| Priority | 3 |
| Number of subchannels | $\lceil \log_2(N^{SL}_{subChannel})\rceil$<br><br>Where $N^{SL}_{subChannel}$ is provided by the higher layer *parameter sl-NumSubchannel* |
| Resource reservation period | Y<br><br>Where $Y = \lceil \log_2 N_{rsv\_period}\rceil$ with that $N_{rsv\_period}$ is the number of entries in the higher layer parameter *sl-ResourceReservePeriodList*, if higher layer parameter sl-*MultiReserveResoure* is configured; $Y = 0$ otherwise. |
| Resource selection window location | $2\big(10 + \lceil \log_2(10 \cdot 2^\mu)\rceil\big)$<br><br>Where μ is 0, 1, 2, 3 for SCS of 15kHz, 30kHz, 60kHz, 120kHz, respectively. |
| Resource set type | 1 bit if *determineResourceSetTypeScheme1* is set to 'UE-B's request', otherwise, 0 bit |

| Field name | Field size (in bits) |
|---|---|
| Providing/requesting indicator | 1 |
| Resource combination(s) | $N * \left\{ \left\lceil \log_2\left( \dfrac{N_{subChannel}^{SL}\left(N_{subChannel}^{SL}+1\right)\left(2N_{subChannel}^{SL}+1\right)}{6} \right) \right\rceil + 9 + Y \right\}$<br><br>Where $N_{subChannel}^{SL}$ is provided by the higher layer parameter sl-NumSubchannel, $Y = \lceil \log_2 N_{rsv\_period} \rceil$ with that $N_{rsv\_period}$ is the number of entries in the higher layer parameter sl-ResourceReservePeriodList, if higher layer parameter sl-MultiReserveResoure is configured; $Y = 0$ otherwise. |
| First resource location(s) | $(N - 1) * \lceil \log_2(X) \rceil$<br><br>Where X is provided by the (pre)configured maximum value of slot offset for the case when MAC CE only is used as a container of inter-UE coordination information |
| Reference slot location | $10 + \lceil \log_2(10 \cdot 2^\mu) \rceil$<br><br>Where μ is 0, 1, 2, 3 for SCS of 15kHz, 30kHz, 60kHz, 120kHz, respectively. |
| Resource set type | 1 |
| Lowest subchannel indices for the first resource location of each TRIV | $N * \lceil \log_2\left(N_{subchannel}^{SL}\right) \rceil$<br><br>Where $N_{subchannel}^{SL}$ is provided by the higher layer parameter sl-NumSubchannel. |

FIG. 6B

710 Communicate an inter-UE coordination (IUC) message with a second UE, the IUC message comprising first beam maintenance reference signal (BM RS) information 720 Transmit a BM RS using, based on the first BM RS information, a set of BM RS resources

700

Communicate an inter-UE coordination (IUC) message with a first UE, the IUC message comprising first beam maintenance reference signal (BM RS) information Receive a BM RS using, based on the first BM RS information, a set of BM RS resources

810

820

800

INDICATING BEAM MAINTENANCE REFERENCE SIGNAL RESOURCES

FIELD OF THE DISCLOSURE

Aspects of the present disclosure generally relate to wireless communication and to techniques and apparatuses for indicating beam maintenance reference signal resources.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a first user equipment (UE) for wireless communication. The first user equipment may include one or more memories and one or more processors coupled to the one or more memories. The one or more processors may be configured to communicate an inter-UE coordination (IUC) message with a second UE, the IUC message comprising first beam maintenance reference signal (BM RS) information. The one or more processors may be configured to transmit a BM RS using, based on the first BM RS information, a set of BM RS resources.

Some aspects described herein relate to a second UE for wireless communication. The second user equipment may include one or more memories and one or more processors coupled to the one or more memories. The one or more processors may be configured to communicate an IUC message with a first UE, the IUC message comprising first BM RS information. The one or more processors may be configured to receive a BM RS using, based on the first BM RS information, a set of BM RS resources.

Some aspects described herein relate to a method of wireless communication performed by a first UE. The method may include communicating an IUC message with a second UE, the IUC message comprising first BM RS information. The method may include transmitting a BM RS using, based on the first BM RS information, a set of BM RS resources.

Some aspects described herein relate to a method of wireless communication performed by a second UE. The method may include communicating an IUC message with a first UE, the IUC message comprising first BM RS information. The method may include receiving a BM RS using, based on the first BM RS information, a set of BM RS resources.

Some aspects described herein relate to a non-transitory computer-readable medium that stores a set of instructions for wireless communication by a first UE. The set of instructions, when executed by one or more processors of the UE, may cause the UE to communicate an IUC message with a second UE, the IUC message comprising first BM RS information. The set of instructions, when executed by one or more processors of the UE, may cause the UE to transmit a BM RS using, based on the first BM RS information, a set of BM RS resources.

Some aspects described herein relate to a non-transitory computer-readable medium that stores a set of instructions for wireless communication by a second UE. The set of instructions, when executed by one or more processors of the UE, may cause the UE to communicate an IUC message with a first UE, the IUC message comprising first BM RS information. The set of instructions, when executed by one or more processors of the UE, may cause the UE to receive a BM RS using, based on the first BM RS information, a set of BM RS resources.

Some aspects described herein relate to an apparatus for wireless communication. The apparatus may include means for communicating an IUC message with a UE, the IUC message comprising first BM RS information. The apparatus may include means for transmitting a BM RS using, based on the first BM RS information, a set of BM RS resources.

Some aspects described herein relate to an apparatus for wireless communication. The apparatus may include means for communicating an IUC message with a UE, the IUC message comprising first BM RS information. The apparatus may include means for receiving a BM RS using, based on the first BM RS information, a set of BM RS resources.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6A is a diagram illustrating an example of an inter-UE coordination (IUC) request message associated with indicating BM RS resources, in accordance with the present disclosure.

FIG. 6B is a diagram illustrating an example of an IUC information message associated with indicating BM RS resources, in accordance with the present disclosure.

DETAILED DESCRIPTION

Figure 1:
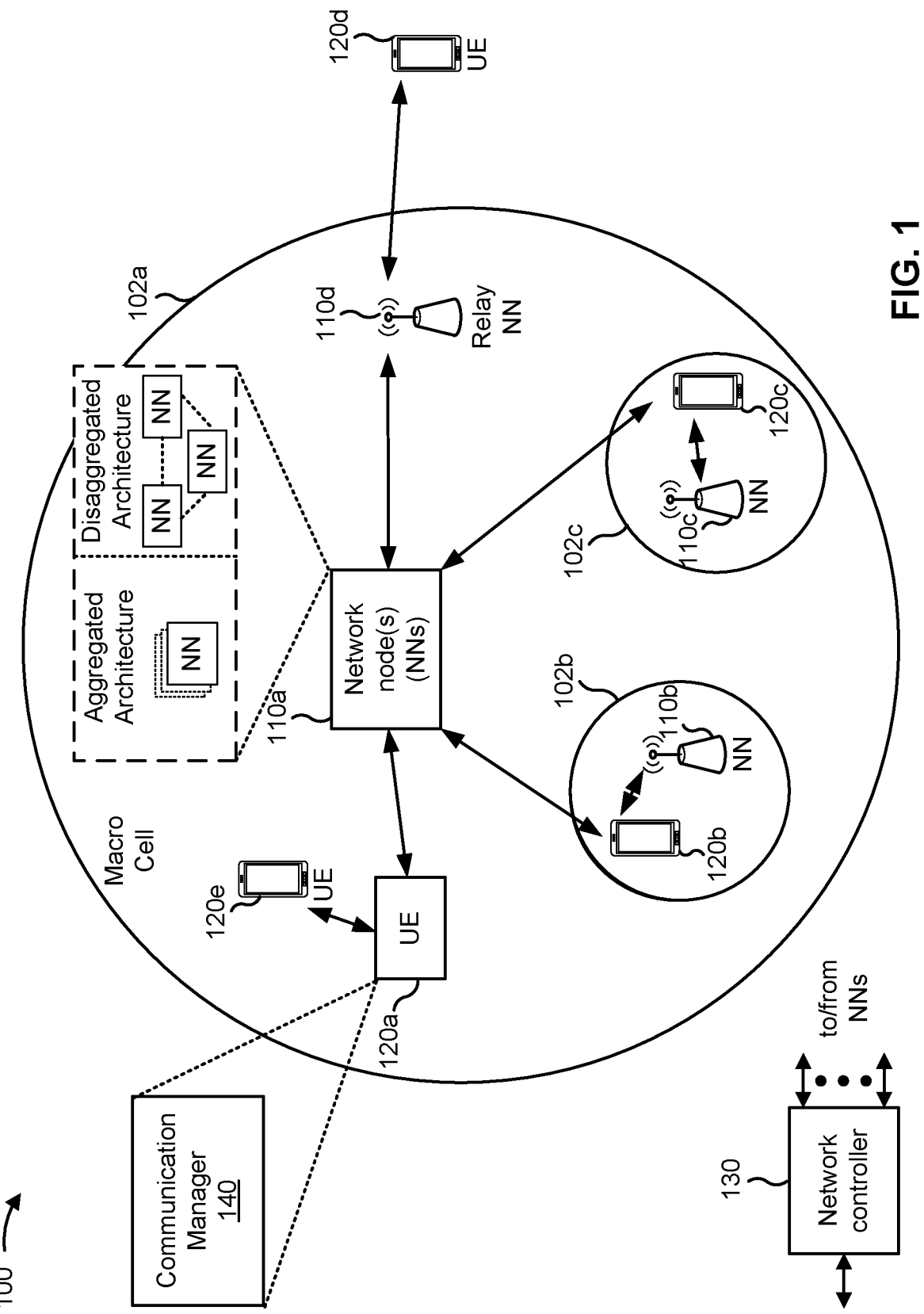
FIG. 1 is a diagram illustrating an example of a wireless network, in accordance with the present disclosure.

In some cases, inter-user equipment (UE) coordination may be implemented to improve reliability and efficiency. In the case of the second transmission mode operations, each transmitting UE can perform a sensing operation to find occupied and/or available resources to utilize for an upcoming transmission. For example, UEs participating in sidelink communications can share resource information (e.g., a reservation received from other UEs in the system) indicating time and frequency resources reserved for one or more future transmissions. In some cases, for example, inter-UE coordination in the second transmission mode of sidelink communications can be specified according to an inter-UE coordination scheme in which a first UE transmits inter-UE coordination information to a second UE. The inter-UE coordination can include a set of preferred resources and/or a set of non-preferred resources. In some cases, the inter-UE coordination can include additional coordination information. The UE can use the coordination information for resource selection and/or re-selection.

In some cases, after two sidelink UEs have found a pair of beams for communicating, it may be beneficial to maintain the beam pair. To maintain the beam pair, the UE may transmit a beam maintenance (a.k.a, beam management) reference signal (BM RS) to the other UE periodically using the beam pair. In some cases, the UE may transmit one or more additional BM RSs via additional beam pairs. If the other UE does not receive the BM RS with a high enough Rx signal quality, the other UE can trigger a beam failure recovery procedure. In some cases, the UEs can switch beams if they find a better beam pair. However, without knowing which communication resources (e.g., time resources and/or frequency resources) are to be used to transmit or receive the BM RSs, the maintenance of the beam pair and/or switch to a better beam pair may not occur efficiently due to a failure to receive the BM RS and/or a failure to accurately measure the BM RS.

Some aspects of the techniques and apparatuses described herein may provide for using inter-UE coordination to indicate BM RS resources. In some aspects, for example, a first UE may communicate (e.g., transmit or receive) an inter-UE coordination (IUC) message with a second UE. The IUC message may include first BM RS information. The first UE may transmit a BM RS using, based on the first BM RS information, a set of BM RS resources. In this way, some aspects may facilitate indication of the BM RS resources to be used for the BM RS, thereby improving the chances that the BM RS will be received and the beam pair for communication will be maintained (and/or switching to other beam pairs may be more efficient). As a result, some aspects may positively impact sidelink network performance.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects and examples generally include a method, apparatus, network node, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component-based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110_a_ may be a macro network node for a macro cell 102_a_, the network node 110_b_ may be a pico network node for a pico cell 102_b_, and the network node 110_c_ may be a femto network node for a femto cell 102_c_. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110_d_ (e.g., a relay network node) may communicate with the network node 110_a_ (e.g., a macro network node) and the UE 120_d_ in order to facilitate communication between the network node 110_a_ and the UE 120_d_. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first UE (e.g., the UE 120) may include a communication manager 140. As described in more detail elsewhere herein, the communication manager 140 may communicate an inter-UE coordination (IUC) message with a second UE, the IUC message comprising first beam maintenance reference signal (BM RS) information; and transmit a BM RS using, based on the first BM RS information, a set of BM RS resources. In some aspects, the communication manager 140 may be implemented in a second UE and may communicate an IUC message with a first UE, the IUC message comprising first BM RS information; and receive a BM RS using, based on the first BM RS information, a set of BM RS resources. Additionally, or alternatively, the communication manager 140 may perform one or more other operations described herein.

As indicated above, FIG. 1 is provided as an example. Other examples may differ from what is described with regard to FIG. 1.

Figure 2:
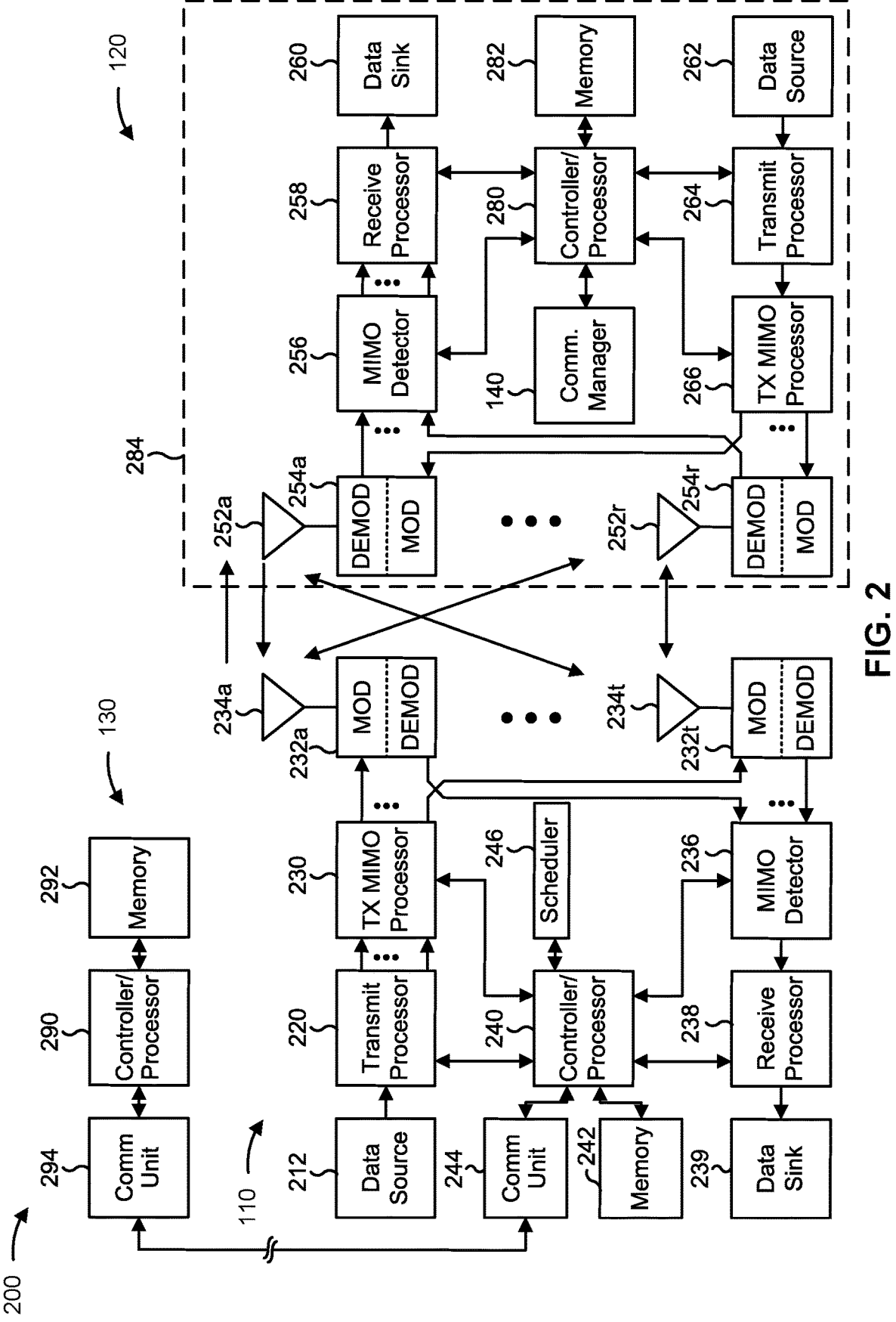
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

Each of the antenna elements may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Beamforming may be used for communications between a UE and a network node, such as for millimeter wave communications and/or the like. In such a case, the network node may provide the UE with a configuration of transmission configuration indicator (TCI) states that respectively indicate beams that may be used by the UE, such as for receiving a physical downlink shared channel (PDSCH). A TCI state indicates a spatial parameter for a communication. For example, a TCI state for a communication may identify a source signal (such as a synchronization signal block, a channel state information reference signal, or the like) and a spatial parameter to be derived from the source signal for the purpose of transmitting or receiving the communication. For example, the TCI state may indicate a quasi-co-location (QCL) type. A QCL type may indicate one or more spatial parameters to be derived from the source signal. The source signal may be referred to as a QCL source. The network node may indicate an activated TCI state to the UE, which the UE may use to select a beam for receiving the PDSCH.

A beam indication may be, or include, a TCI state information element, a beam identifier (ID), spatial relation information, a TCI state ID, a closed loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a QCL type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

The beam indication may be a joint or separate downlink (DL)/uplink (UL) beam indication in a unified TCI framework. In some cases, the network may support layer 1 (L1)-based beam indication using at least UE-specific (unicast) downlink control information (DCI) to indicate joint or separate DL/UL beam indications from active TCI states. In some cases, existing DCI formats 1_1 and/or 1_2 may be reused for beam indication. The network may include a support mechanism for a UE to acknowledge successful decoding of a beam indication. For example, the acknowledgment/negative acknowledgment (ACK/NACK) of the PDSCH scheduled by the DCI carrying the beam indication may be also used as an ACK for the DCI.

Beam indications may be provided for carrier aggregation (CA) scenarios. In a unified TCI framework, information the network may support common TCI state ID update and activation to provide common QCL and/or common UL transmission spatial filter or filters across a set of configured component carriers (CCs). This type of beam indication may apply to intra-band CA, as well as to joint DL/UL and separate DL/UL beam indications. The common TCI state ID may imply that one reference signal (RS) determined according to the TCI state(s) indicated by a common TCI state ID is used to provide QCL Type-D indication and to determine UL transmission spatial filters across the set of configured CCs.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the network node 110, the controller/processor 280 of the UE 120, and/or any other component(s) of FIG. 2 may perform one or more techniques associated with indicating BM RS resources, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a first UE (e.g., the UE 120) includes means for communicating an IUC message with a second UE, the IUC message comprising first BM RS information; and/or means for transmitting a BM RS using, based on the first BM RS information, a set of BM RS resources. In some aspects, a second UE (e.g., UE 120) includes means for communicating an IUC message with a first UE, the IUC message comprising first BM RS information; and/or means for receiving a BM RS using, based on the first BM RS information, a set of BM RS resources. The means for the first UE and/or the second UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
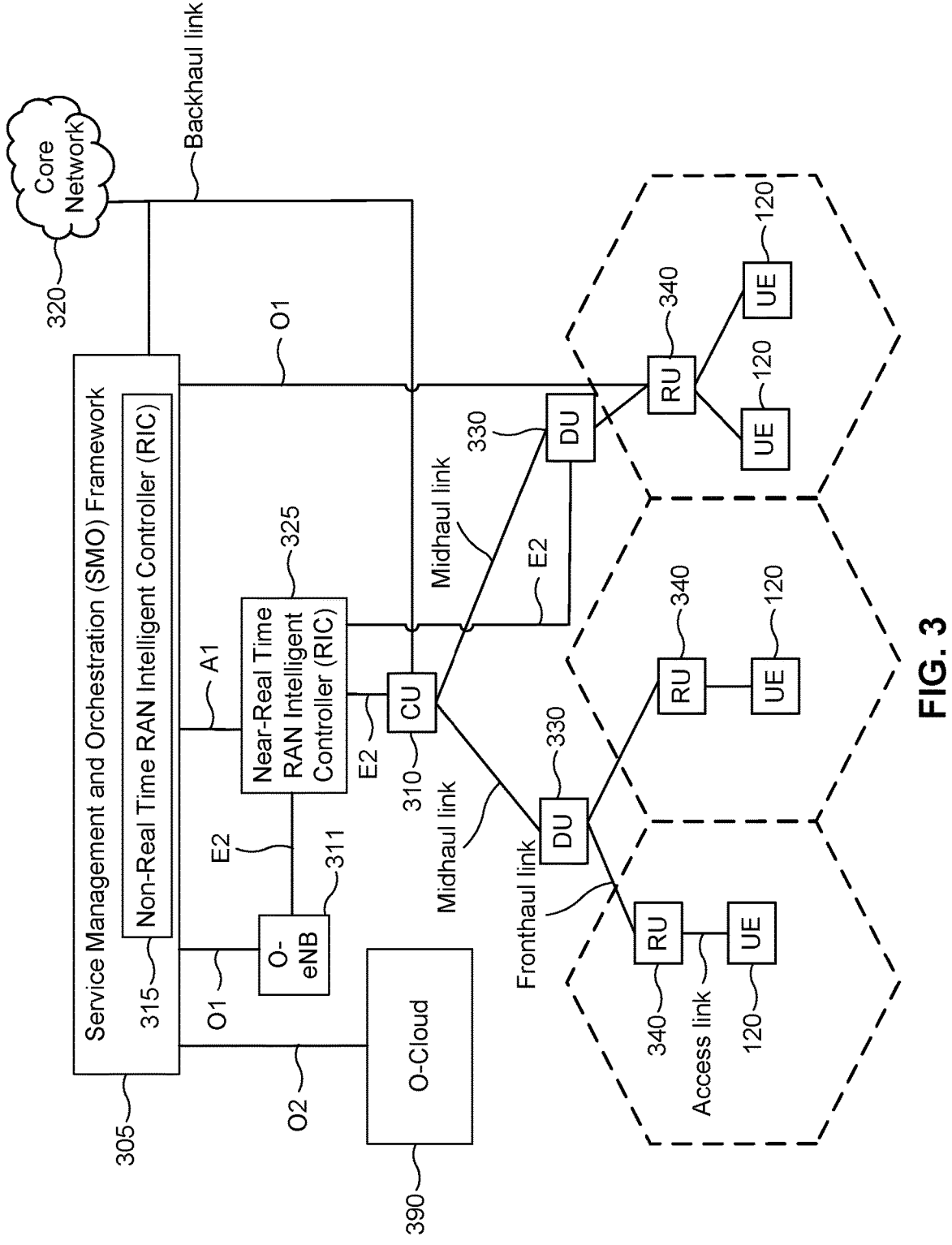
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
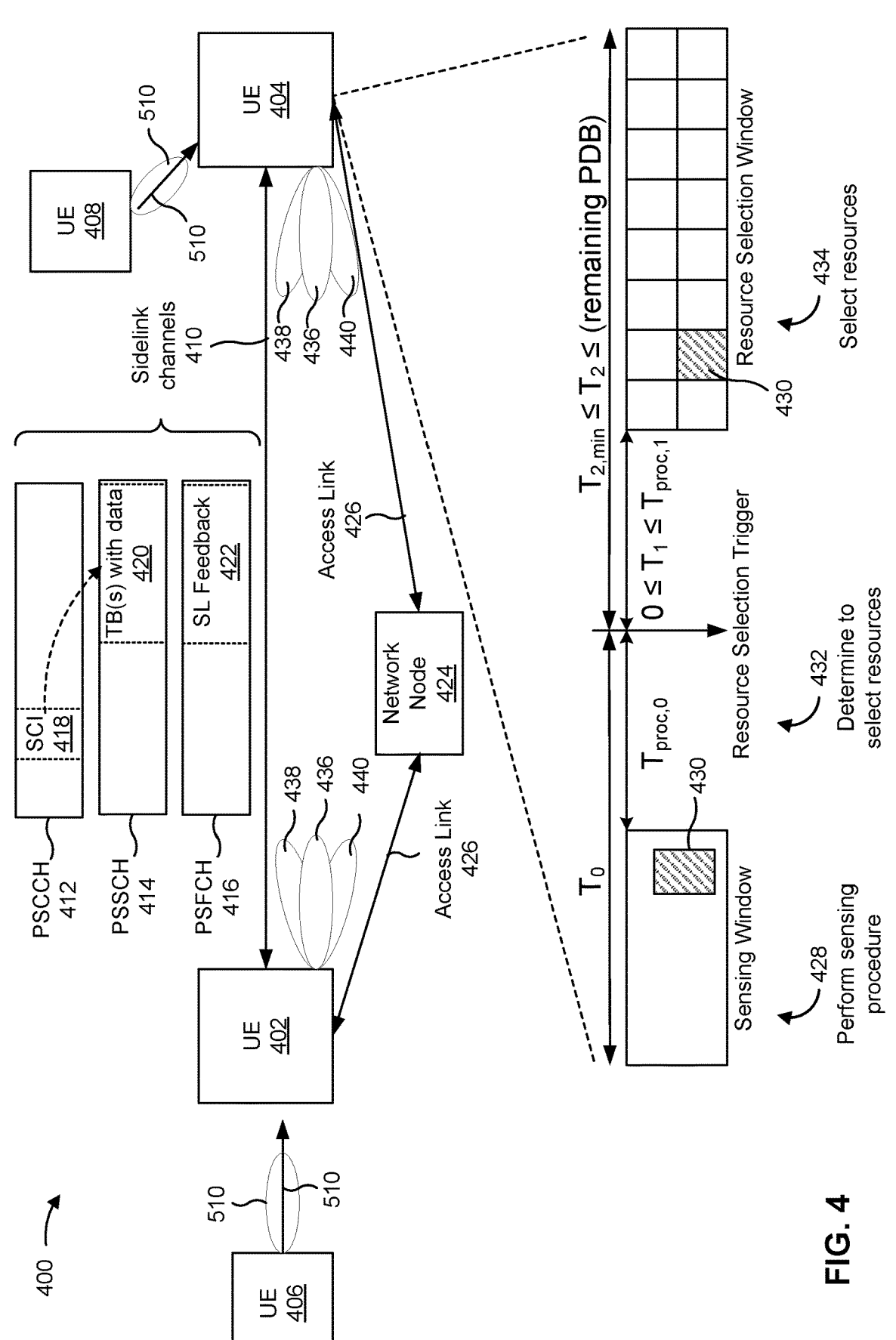
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 402 may communicate with a second UE 404 (and one or more other UEs 406 and/or 408) via one or more sidelink channels 410. The UEs 402 and 404 may communicate using the one or more sidelink channels 410 for P2P communications, D2D communications, V2X communications (e.g., which may include V2V communications, V2I communications, and/or V2P communications) and/or mesh networking. In some aspects, the UEs 402 and 404 may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 402 and 404 may synchronize timing of transmission time intervals (TTIs) (e.g., frames, subframes, slots, or symbols) using global navigation satellite system (GNSS) timing.

As further shown in FIG. 4, the one or more sidelink channels 410 may include a physical sidelink control channel (PSCCH) 412, a PSSCH 414, and/or a PSFCH 416. The PSCCH 412 may be used to communicate control information, similar to a physical downlink control channel (PDCCH) and/or a PUCCH used for cellular communications with a network node 110 via an access link or an access channel. The PSSCH 414 may be used to communicate data, similar to a physical downlink shared channel (PDSCH) and/or a physical uplink shared channel (PUSCH) used for cellular communications with a network node 110 via an access link or an access channel. For example, the PSCCH 412 may carry SCI 418, which may indicate various control information used for sidelink communications, such as one or more resources (e.g., time resources, frequency resources, and/or spatial resources) where a transport block (TB) 420 may be carried on the PSSCH 414. The TB 420 may include data. The PSFCH 416 may be used to communicate sidelink feedback 422, such as HARQ feedback (e.g., acknowledgement or negative acknowledgement (ACK/NACK) information), transmit power control (TPC), and/or a scheduling request (SR).

HARQ feedback provides a mechanism for indicating, to a transmitter of a communication, whether the communication was successfully received or not. For example, the transmitter may transmit scheduling information for the communication. A receiver of the scheduling information may monitor resources indicated by the scheduling information in order to receive the communication. If the receiver successfully receives the communication, the receiver may transmit an acknowledgment (ACK) in HARQ feedback. If the receiver fails to receive the communication, the receiver may transmit a negative ACK (NACK) in HARQ feedback. Thus, based at least in part on the HARQ feedback, the transmitter can determine whether the communication should be retransmitted. HARQ feedback is often implemented using a single bit, where a first value of the bit indicates an ACK and a second value of the bit indicates a NACK. Such a bit may be referred to as a HARQ-ACK bit. HARQ-ACK feedback may be conveyed in a HARQ codebook, which may include one or more bits indicating ACKs or NACKs corresponding to one or more communications and may be referred to as HARQ feedback information (or, in the case of sidelink communications, "sidelink HARQ feedback information").

A HARQ-ACK bit may be referred to as an ACK/NACK and/or a HARQ-ACK and may be associated with a HARQ process. The HARQ process refers to the determination of whether to report an ACK or NACK associated with a transmission, a time resource associated with the transmission (e.g., a symbol or a slot), and/or a frequency resource associated with the transmission (e.g., a resource block (RB), a subchannel, a channel, a bandwidth, and/or a bandwidth part). Accordingly, an ACK/NACK may be interchangeably referred to as being associated with a transmission, a time resource, a frequency resource, and/or a HARQ process.

Although shown on the PSCCH 412, in some aspects, the SCI 418 may include multiple communications in different stages, such as a first stage SCI (SCI-1) and a second stage SCI (SCI-2). The SCI-1 may be transmitted on the PSCCH 412. The SCI-2 may be transmitted on the PSSCH 414. The SCI-1 may include, for example, an indication of one or more resources (e.g., time resources, frequency resources, and/or spatial resources) on the PSSCH 414, information for decoding sidelink communications on the PSSCH, a quality of service (QOS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 414, such as a HARQ process ID, a new data indicator (NDI), a source identifier, a destination identifier, and/or a channel state information (CSI) report trigger.

In some aspects, the one or more sidelink channels 410 may use resource pools. Resource pools may be defined for sidelink transmission and sidelink reception. A resource pool may include one or more sub-channels in the frequency domain and one or more slots in the time domain. For example, the minimum resource allocation in the frequency domain may be a sub-channel, and the minimum resource allocation in the time domain may be a slot. In some aspects, one or more slots of a resource pool may be unavailable for sidelink communications. For example, a scheduling assignment (e.g., included in SCI 418) may be transmitted in sub-channels using specific resource blocks (RBs) across time. In some aspects, data transmissions (e.g., on the PSSCH 414) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 402 may operate using a sidelink transmission mode (e.g., Mode 1) where resource selection and/or scheduling is performed by a network node 110 (e.g., a base station, a CU, or a DU). For example, the UE 402 may receive a grant (e.g., in DCI or in a radio resource control (RRC) message, such as for configured grants) from the network node 110 (e.g., directly or via one or more network nodes) for sidelink channel access and/or scheduling. In some aspects, a UE 402 may operate using a transmission mode (e.g., Mode 2) where resource selection and/or scheduling is performed by the UE 402 (e.g., rather than a network node 110). In some aspects, the UE 402 may perform resource selection and/or scheduling by sensing channel availability for transmissions. For example, the UE 402 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 402 may perform resource selection and/or scheduling using SCI 418 received in the PSCCH 412, which may indicate occupied resources and/or channel parameters. Additionally, or alternatively, the UE 402 may perform resource selection and/or scheduling by determining a channel busy ratio (CBR) associated with various sidelink channels, which may be used for rate control (e.g., by indicating a maximum number of resource blocks that the UE 402 can use for a particular set of subframes).

In the transmission mode where resource selection and/or scheduling is performed by a UE 402, the UE 402 may generate sidelink grants, and may transmit the grants in SCI 418. A sidelink grant may indicate, for example, one or more parameters (e.g., transmission parameters) to be used for an upcoming sidelink transmission, such as one or more resource blocks to be used for the upcoming sidelink transmission on the PSSCH 414 (e.g., for TBs 420), one or more subframes to be used for the upcoming sidelink transmission, and/or an MCS to be used for the upcoming sidelink transmission. In some aspects, a UE 402 may generate a sidelink grant that indicates one or more parameters for semi-persistent scheduling (SPS), such as a periodicity of a sidelink transmission. Additionally, or alternatively, the UE 402 may generate a sidelink grant for event-driven scheduling, such as for an on-demand sidelink message.

As shown, a network node 424 may communicate with the UE 402 and/or the UE 404 (e.g., directly or via one or more network nodes), such as via an access link 426. A direct link between the UEs 402 and 404 (e.g., via a PC5 interface) may be referred to as a sidelink, and a direct link between a network node 424 and a UE 402 or 404 (e.g., via a Uu interface) may be referred to as an access link. Sidelink communications may be transmitted via the sidelink, and access link communications may be transmitted via the access link. An access link communication may be either a downlink communication (from the network node 424 to the UE 402 or 404) or an uplink communication (from a UE 402 or 404 to the network node 424).

Additionally, or alternatively, the UE 402 and/or 404 can perform resource selection and/or scheduling using SCI 418 received in the PSCCH 412, which can indicate occupied resources and/or channel parameters. Additionally, or alternatively, the UE 402 and/or 404 can perform resource selection and/or scheduling by determining a channel busy ratio (CBR) associated with various sidelink channels, which can be used for rate control (e.g., by indicating a maximum number of resource blocks that the UE 402 and/or 404 can use for a particular set of subframes).

In the second transmission mode, the UE 402 and/or 404 can generate sidelink grants, and can transmit the grants in SCI 418. A sidelink grant can indicate, for example, one or more parameters (e.g., transmission parameters) to be used for an upcoming sidelink transmission, such as one or more resource blocks to be used for the upcoming sidelink transmission on the PSSCH 414 (e.g., for TBs 420), and/or one or more subframes to be used for the upcoming sidelink transmission. In some aspects, a UE 402 and/or 404 can generate a sidelink grant that indicates one or more parameters for semi-persistent scheduling (SPS), such as a periodicity of a sidelink transmission. Additionally, or alternatively, the UE 402 and/or 404 can generate a sidelink grant for event-driven scheduling, such as for an on-demand sidelink message.

In some cases, inter-UE coordination may be implemented to improve reliability and efficiency. In the case of the second transmission mode operations, each transmitting UE can perform a sensing operation to find occupied and/or available resources to utilize for an upcoming transmission. For example, UEs participating in sidelink communications can share resource information (e.g., a reservation received from other UEs in the system) indicating time and frequency resources reserved for one or more future transmissions. In some cases, for example, inter-UE coordination in the second transmission mode of sidelink communications can be specified according to an inter-UE coordination scheme in which a first UE transmits inter-UE coordination information to a second UE. The inter-UE coordination can include a set of preferred resources and/or a set of non-preferred resources. In some cases, the inter-UE coordination can include additional coordination information. The UE can use the coordination information for resource selection and/or re-selection.

In a scheme 1 IUC scenario, the UE 402 may request UE 404 to find candidate (preferred or non-preferred) resources for a future transmission by the UE 402 to the UE 404. The UE 404 may or may not be the intended receiver of future transmissions by the UE 402. If the UE 404 provides the UE 402 with preferred resources, then the UE 402 will try to select transmission resources that overlap with the preferred resources of the UE 404. If the UE 404 provides the UE 402 with non-preferred resource, then the UE 402 will try to avoid transmitting in the non-preferred resources of the UE 404. The UE 404 can determine the candidate resources based on its own channel sensing operation.

For example, the UE 404 can listen for SCIs from other, nearby UEs. SCIs contain resource reservations, reserving Tx resources in the future. As shown by reference number 428, for example, the UE 404 may perform a sensing procedure in a sensing window. The sensing window is the time interval defined by a range of slots $[n-T_0, n-T^{SL}_{poc,0}]$, where n is the resource selection (or reselection) trigger or slot at which new resources must be selected, $T_0$ is configured as 100 milliseconds (ms) (e.g., for aperiodic resource reservation, such as aperiodic reservation in one or more slots of up to 32 logical slots in the future) or 1100 ms (e.g., for periodic resource reservation), and $T^{SL}_{proc,0}$ is the time required to complete the sensing procedure. In some cases, a UE configured for communication in an NR network can use a sensing procedure for aperiodic or periodic resource reservation.

According to the channel sensing procedure, the UE 404 can decode control messages relating to resource reservations of other UEs, as well as perform measurements (e.g., RSRP measurements and/or RSSI measurements, among other examples) associated with one or more sidelink channels. For example, UEs can transmit reservation information (e.g., in SCI) that indicates a resource reservation for a current slot (e.g., the slot in which the reservation information is transmitted) and for one or more (e.g., up to two) future slots. A resource allocation associated with a resource reservation may be one or more sub-channels in a frequency domain and one slot in a time domain. In some cases, a resource reservation may be aperiodic or periodic. In periodic resource reservation, a UE can signal (e.g., in the reservation information in SCI) a period for the resource reservation (e.g., a value between 0 ms and 1000 ms). In some cases, the sensing procedure can be performed by a physical layer of the UE based on a request from a MAC layer of the UE 404.

If an SCI from a nearby UE (e.g., UE 408) is received by the UE 404 with high enough RSRP, then the UE 404 can determine that future transmission from the nearby UE 408 in the reserved resources 430 indicated by the SCI will also be received by the UE 404 with high enough RSRP. If the UE 404 happens to be the intended receiver of the future transmission of the UE 402, then in this example, the UE 404 does not prefer to receive from the UE 402 in the same resource 430 that the nearby UE 408 reserves to transmit in. As shown by reference number 432, the UE 404 may determine, based on a resource selection trigger, to select preferred resources and, as shown by reference number 434, the UE 404 may select the preferred resource in a resource selection window. In the above example, the preferred resources may include all of the resources in the resource selection window except for the resource 430.

In some cases, after two sidelink UEs 402 and 404 have found a pair 436 of beams for communicating, it may be beneficial to maintain the beam pair 436. To maintain the beam pair 436, the UE 402 may transmit a beam maintenance reference signal (BM RS) to the UE 404 periodically using the beam pair 436. In some cases, the UE 402 may transmit one or more additional BM RSs via additional beam pairs 438 and 440. If the UE 404 does not receive the BM RS with a high enough Rx signal quality, the UE 404 can trigger a beam failure recovery procedure. In some cases, the UEs 402 and/or 404 can switch beams if they find a better beam pair. However, without knowing which communication resources (e.g., time resources and/or frequency resources) are to be used to transmit the BM RSs, the maintenance of the beam pair 436 and/or switch to a better beam pair may not occur efficiently due to a failure to receive, at the UE 404, the BM RS and/or a failure to accurately measure the BM RS.

Some aspects of the techniques and apparatuses described herein may provide for using inter-UE coordination to indicate BM RS resources. In some aspects, for example, a first UE may communicate (e.g., transmit or receive) an inter-UE coordination (IUC) message with a second UE. The IUC message may include first BM RS information. The first UE may transmit a BM RS using, based on the first BM RS information, a set of BM RS resources. In this way, some aspects may facilitate indication of the BM RS resources to be used for the BM RS, thereby improving the chances that the BM RS will be received and the beam pair for communication will be maintained (and/or switching to other beam pairs may be more efficient). As a result, some aspects may positively impact sidelink network performance.

As indicated above, FIG. 4 is provided as an example. Other examples may differ from what is described with respect to FIG. 4.

Figure 5:
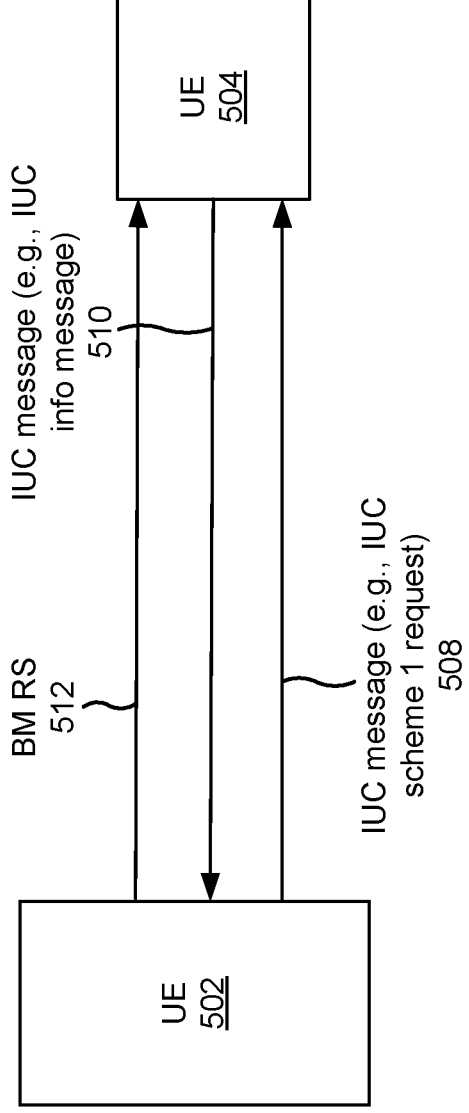
FIG. 5 is a diagram illustrating an example associated with indicating beam maintenance reference signal (BM RS) resources, in accordance with the present disclosure.

FIG. 5 is a diagram illustrating an example 500 associated with indicating BM RS resources, in accordance with the present disclosure. As shown, a UE 502 and a UE 504 may communicate with one another. In some aspects, the UE 502 and/or the UE 504 may be, be similar to, include, or be included in the UE 402 and/or the UE 404 depicted in FIG. 4, and/or the UE 120 depicted in FIGS. 1, 2, and 4.

As shown by reference number 508, the UE 502 may transmit, and the UE 504 may receive, an IUC message. The IUC message may include, for example, an IUC scheme 1 request. For example, the IUC scheme 1 request may include a BM RS request indication. In some aspects, the IUC scheme 1 request may include a BM RS identifier (ID). In some aspects, the IUC message may include first BM RS information. For example, the first BM RS information may include a request for a set of candidate resources. In some aspects, the first BM RS information may be indicative of at least one BM RS parameter associated with the BM RS. The at least one BM RS parameter may be used by the UE 504 to select a set of candidate resources, which may be based on the at least one BM RS parameter. In some aspects, the at least one BM RS parameter may be indicative of a periodicity associated with the BM RS. In some aspects, the at least one BM RS parameter may be indicative of a quantity of resources to be used for transmitting the BM RS. In some aspects, the at least one BM RS parameter may be indicative of at least one of a priority associated with the BM RS, a resource selection window associated with selecting a set of candidate resources, or a resource set type associated with the set of candidate resources. In some aspects, the set of candidate resources may be based on an RSRP threshold. For example, the RSRP threshold may be associated with a beam failure detection configuration.

As shown by reference number 510, the UE 504 may transmit, and the UE 502 may receive, an IUC message. For example, the IUC message may include an IUC information message. The IUC message may indicate the set of candidate resources and/or at least one BM RS resource associated with the BM RS. For example, in cases in which the UE 502 requests a set of candidate resources, the IUC information message may indicate the set of candidate resources. In some other cases, the IUC information message may indicate the set of BM RS resources.

In cases in which a set of candidate resources is requested, the IUC information message may include second BM RS information. The second BM RS information may indicate a set of candidate resources. The set of BM RS resources may be based on the set of candidate resources. In some aspects, the set of candidate resources includes the set of BM RS resources (e.g., the set of candidate resources is a set of preferred resources) and, in some other aspects, the set of candidate resources excludes the set of BM RS resources (e.g., the set of candidate resources is a set of non-preferred resources).

As shown by reference number 512, the UE 502 may transmit, and the UE 504 may receive, a BM RS. For example, the UE 502 may transmit the BM RS based on the set of BM RS resources.

As indicated above, FIG. 5 is provided as an example. Other examples may differ from what is described with respect to FIG. 5.

FIG. 6A is a diagram illustrating an example 600 of an IUC request message associated with indicating BM RS resources, in accordance with the present disclosure. As described above, in connection with FIG. 5, the IUC request message may be transmitted by the UE 502 to the UE 504 to request a set of candidate resources for BM RS transmission. In some aspects, the IUC request, as shown, may include an SCI format 2-C and/or a MAC CE. The IUC request message may include an indication that the ICU request message is a request for a set of BM RS candidate resources. In some aspects, the IUC request message may include a BM RS ID associated with the BM RS to be transmitted. As shown, the IUC request message may indicate at least one BM RS parameter 602. As shown, the IUC request message may include an indication 604 of whether the request is for a preferred set of candidate resources or a non-preferred set of candidate resources.

As indicated above, FIG. 6A is provided as an example. Other examples may differ from what is described with respect to FIG. 6A.

FIG. 6B is a diagram illustrating an example 606 of an IUC information message associated with indicating BM RS resources, in accordance with the present disclosure. As described above, in connection with FIG. 5, the IUC information message may be transmitted by the UE 504 to the UE 502 to provide a set of candidate resources for BM RS transmission. In some aspects, the IUC information message, as shown, may include an SCI format 2-C and/or a MAC CE. The IUC information message may include IUC message in which a providing/requesting indicator 608 is set to "providing." The IUC information message may include an indication that the IUC request message is an indication of a set of BM RS candidate resources. In some aspects, the IUC information message may include a BM RS ID associated with the BM RS to be transmitted.

As indicated above, FIG. 6B is provided as an example. Other examples may differ from what is described with respect to FIG. 6B.

Figure 7:
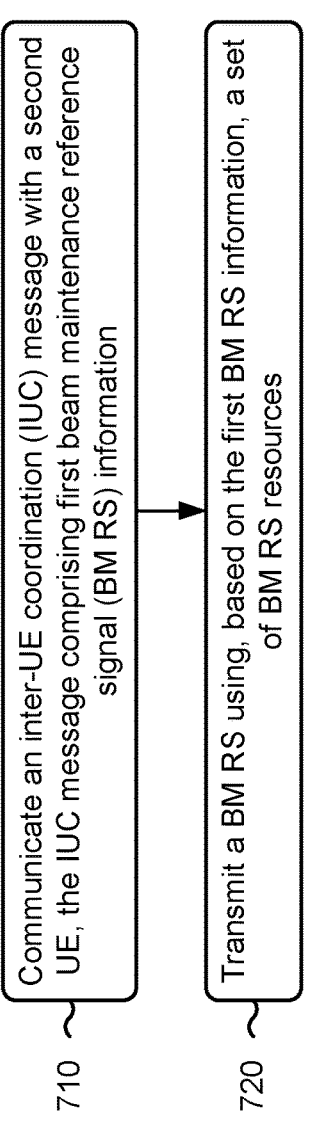
FIG. 7 is a diagram illustrating an example process performed, for example, at a UE or an apparatus of a UE, in accordance with the present disclosure.

FIG. 7 is a diagram illustrating an example process 700 performed, for example, at a UE or an apparatus of a UE, in accordance with the present disclosure. Example process 700 is an example where the apparatus or the UE (e.g., UE 502) performs operations associated with indicating BM RS resources.

As shown in FIG. 7, in some aspects, process 700 may include communicating an IUC message with a second UE, the IUC message comprising first BM RS information (block 710). For example, the UE (e.g., using reception component 902, transmission component 904, and/or communication manager 906, depicted in FIG. 9) may communicate an IUC message with a second UE, the IUC message comprising first BM RS information, as described above.

As further shown in FIG. 7, in some aspects, process 700 may include transmitting a BM RS using, based on the first BM RS information, a set of BM RS resources (block 720). For example, the UE (e.g., using transmission component 904 and/or communication manager 906, depicted in FIG. 9) may transmit a BM RS using, based on the first BM RS information, a set of BM RS resources, as described above.

Process 700 may include additional aspects, such as any single aspect or any combination of aspects described below and/or in connection with one or more other processes described elsewhere herein.

In a first aspect, the first BM RS information comprises a request for a set of candidate resources. In a second aspect, alone or in combination with the first aspect, process 700 includes receiving second BM RS information indicating the set of candidate resources, wherein the set of BM RS resources is based on the set of candidate resources. In a third aspect, alone or in combination with one or more of the first and second aspects, the set of candidate resources includes the set of BM RS resources. In a fourth aspect, alone or in combination with one or more of the first through third aspects, the set of candidate resources excludes the set of BM RS resources.

In a fifth aspect, alone or in combination with one or more of the first through fourth aspects, the first BM RS information is indicative of at least one BM RS parameter associated with the BM RS, and wherein the set of candidate resources is based on the at least one BM RS parameter. In a sixth aspect, alone or in combination with one or more of the first through fifth aspects, the at least one BM RS parameter is indicative of a periodicity associated with the BM RS. In a seventh aspect, alone or in combination with one or more of the first through sixth aspects, the at least one BM RS parameter is indicative of a quantity of resources to be used for transmitting the BM RS. In an eighth aspect, alone or in combination with one or more of the first through seventh aspects, the at least one BM RS parameter is indicative of at least one of a priority, a resource selection window, or a resource set type. In a ninth aspect, alone or in combination with one or more of the first through eighth aspects, the set of candidate resources is based on an RSRP threshold. In a tenth aspect, alone or in combination with one or more of the first through ninth aspects, the RSRP threshold is associated with a beam failure detection configuration.

In an eleventh aspect, alone or in combination with one or more of the first through tenth aspects, the first BM RS information indicates a set of candidate resources, wherein the set of BM RS resources is based on the set of candidate resources. In a twelfth aspect, alone or in combination with one or more of the first through eleventh aspects, the IUC message comprises an IUC scheme 1 request. In a thirteenth aspect, alone or in combination with one or more of the first through twelfth aspects, the IUC scheme 1 request comprises a BM RS request indication. In a fourteenth aspect, alone or in combination with one or more of the first through thirteenth aspects, the IUC scheme 1 request comprises a BM RS ID. In a fifteenth aspect, alone or in combination with one or more of the first through fourteenth aspects, the IUC message comprises an IUC information message. In a sixteenth aspect, alone or in combination with one or more of the first through fifteenth aspects, the IUC information message comprises a BM RS request indication. In a seventeenth aspect, alone or in combination with one or more of the first through sixteenth aspects, the IUC information message comprises a BM RS ID.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
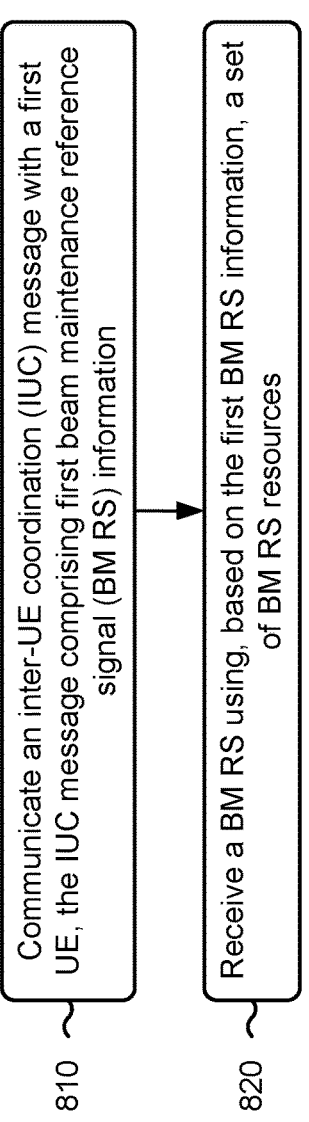
FIG. 8 is a diagram illustrating an example process performed, for example, at a UE or an apparatus of a UE, in accordance with the present disclosure.

FIG. 8 is a diagram illustrating an example process 800 performed, for example, at a UE or an apparatus of a UE, in accordance with the present disclosure. Example process 800 is an example where the apparatus or the UE (e.g., UE 504) performs operations associated with indicating BM RS resources.

As shown in FIG. 8, in some aspects, process 800 may include communicating an IUC message with a first UE, the IUC message comprising first BM RS information (block 810). For example, the UE (e.g., using reception component 902, transmission component 904, and/or communication manager 906, depicted in FIG. 9) may communicate an IUC message with a first UE, the IUC message comprising first BM RS information, as described above.

As further shown in FIG. 8, in some aspects, process 800 may include receiving a BM RS using, based on the first BM RS information, a set of BM RS resources (block 820). For example, the UE (e.g., using reception component 902 and/or communication manager 906, depicted in FIG. 9) may receive a BM RS using, based on the first BM RS information, a set of BM RS resources, as described above.

Process 800 may include additional aspects, such as any single aspect or any combination of aspects described below and/or in connection with one or more other processes described elsewhere herein.

In a first aspect, the first BM RS information comprises a request for a set of candidate resources. In a second aspect, alone or in combination with the first aspect, process 800 includes transmitting second BM RS information indicating the set of candidate resources, wherein the set of BM RS resources is based on the set of candidate resources. In a third aspect, alone or in combination with one or more of the first and second aspects, the set of candidate resources includes the set of BM RS resources. In a fourth aspect, alone or in combination with one or more of the first through third aspects, the set of candidate resources excludes the set of BM RS resources.

In a fifth aspect, alone or in combination with one or more of the first through fourth aspects, the first BM RS information is indicative of at least one BM RS parameter associated with the BM RS, and wherein the set of candidate resources is based on the at least one BM RS parameter. In a sixth aspect, alone or in combination with one or more of the first through fifth aspects, the at least one BM RS parameter is indicative of a periodicity associated with the BM RS. In a seventh aspect, alone or in combination with one or more of the first through sixth aspects, the at least one BM RS parameter is indicative of a quantity of resources to be used for transmitting the BM RS. In an eighth aspect, alone or in combination with one or more of the first through seventh aspects, the at least one BM RS parameter is indicative of at least one of a priority, a resource selection window, or a resource set type. In a ninth aspect, alone or in combination with one or more of the first through eighth aspects, the set of candidate resources is based on an RSRP threshold. In a tenth aspect, alone or in combination with one or more of the first through ninth aspects, the RSRP threshold is associated with a beam failure detection configuration. In an eleventh aspect, alone or in combination with one or more of the first through tenth aspects, the first BM RS information indicates a set of candidate resources, wherein the set of BM RS resources is based on the set of candidate resources.

In a twelfth aspect, alone or in combination with one or more of the first through eleventh aspects, the IUC message comprises an IUC scheme 1 request. In a thirteenth aspect, alone or in combination with one or more of the first through twelfth aspects, the IUC scheme 1 request comprises a BM RS request indication. In a fourteenth aspect, alone or in combination with one or more of the first through thirteenth aspects, the IUC scheme 1 request comprises a BM RS ID. In a fifteenth aspect, alone or in combination with one or more of the first through fourteenth aspects, the IUC message comprises an IUC information message. In a sixteenth aspect, alone or in combination with one or more of the first through fifteenth aspects, the IUC information message comprises a BM RS request indication. In a seventeenth aspect, alone or in combination with one or more of the first through sixteenth aspects, the IUC information message comprises a BM RS ID.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
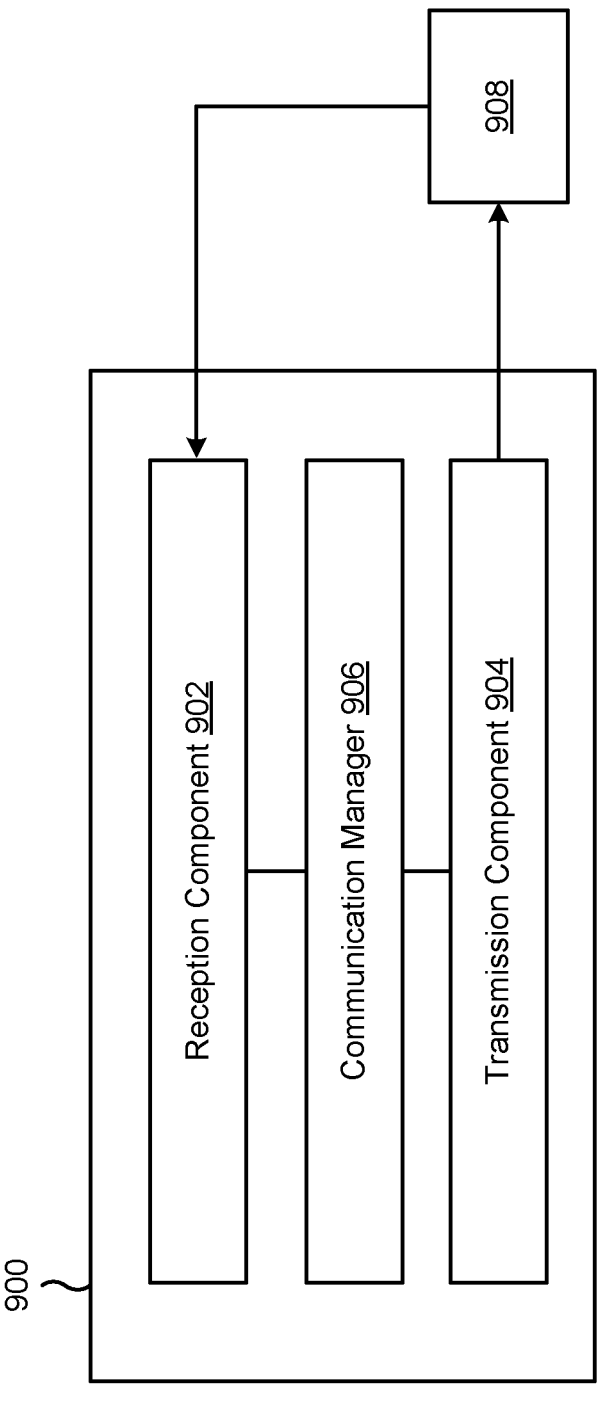
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 140 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIGS. 5-6B. Additionally, or alternatively, the apparatus 900 may be configured to perform one or more processes described herein, such as process 700 of FIG. 7, process 800 of FIG. 8, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 904 may be co-located with the reception component 902 in one or more transceivers.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The reception component 902 and/or the transmission component 904 may communicate an IUC message with a second UE, the IUC message comprising first BM RS information. The transmission component 904 may transmit a BM RS using, based on the first BM RS information, a set of BM RS resources. The reception component 902 may receive second BM RS information indicating the set of candidate resources, wherein the set of BM RS resources is based on the set of candidate resources.

The reception component 902 and/or the transmission component 904 may communicate an IUC message with a first UE, the IUC message comprising first BM RS information. The reception component 902 may receive a BM RS using, based on the first BM RS information, a set of BM RS resources. The transmission component 904 may transmit second BM RS information indicating the set of candidate resources, wherein the set of BM RS resources is based on the set of candidate resources.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a first user equipment (UE), comprising: communicating an inter-UE coordination (IUC) message with a second UE, the IUC message comprising first beam maintenance reference signal (BM RS) information; and transmitting a BM RS using, based on the first BM RS information, a set of BM RS resources.

Aspect 2: The method of Aspect 1, wherein the first BM RS information comprises a request for a set of candidate resources.

Aspect 3: The method of Aspect 2, further comprising receiving second BM RS information indicating the set of candidate resources, wherein the set of BM RS resources is based on the set of candidate resources.

Aspect 4: The method of Aspect 3, wherein the set of candidate resources includes the set of BM RS resources.

Aspect 5: The method of Aspect 3, wherein the set of candidate resources excludes the set of BM RS resources.

Aspect 6: The method of any of Aspects 2-5, wherein the first BM RS information is indicative of at least one BM RS parameter associated with the BM RS, and wherein the set of candidate resources is based on the at least one BM RS parameter.

Aspect 7: The method of Aspect 6, wherein the at least one BM RS parameter is indicative of a periodicity associated with the BM RS.

Aspect 8: The method of either of claim 6 or 7, wherein the at least one BM RS parameter is indicative of a quantity of resources to be used for transmitting the BM RS.

Aspect 9: The method of any of Aspects 6-8, wherein the at least one BM RS parameter is indicative of at least one of a priority, a resource selection window, or a resource set type.

Aspect 10: The method of any of Aspects 2-9, wherein the set of candidate resources is based on a reference signal received power (RSRP) threshold.

Aspect 11: The method of Aspect 10, wherein the RSRP threshold is associated with a beam failure detection configuration.

Aspect 12: The method of Aspect 1, wherein the first BM RS information indicates a set of candidate resources, wherein the set of BM RS resources is based on the set of candidate resources.

Aspect 13: The method of any of Aspects 1-12, wherein the IUC message comprises an IUC scheme 1 request.

Aspect 14: The method of Aspect 13, wherein the IUC scheme 1 request comprises a BM RS request indication.

Aspect 15: The method of either of claim 13 or 14, wherein the IUC scheme 1 request comprises a BM RS identifier (ID).

Aspect 16: The method of any of Aspects 1-12, wherein the IUC message comprises an IUC information message.

Aspect 17: The method of Aspect 16, wherein the IUC information message comprises a BM RS request indication.

Aspect 18: The method of either of claim 16 or 17, wherein the IUC information message comprises a BM RS identifier (ID).

Aspect 19: A method of wireless communication performed by a second user equipment (UE), comprising: communicating an inter-UE coordination (IUC) message with a first UE, the IUC message comprising first beam maintenance reference signal (BM RS) information; and receiving a BM RS using, based on the first BM RS information, a set of BM RS resources.

Aspect 20: The method of Aspect 19, wherein the first BM RS information comprises a request for a set of candidate resources.

Aspect 21: The method of Aspect 20, further comprising transmitting second BM RS information indicating the set of candidate resources, wherein the set of BM RS resources is based on the set of candidate resources.

Aspect 22: The method of Aspect 21, wherein the set of candidate resources includes the set of BM RS resources.

Aspect 23: The method of Aspect 21, wherein the set of candidate resources excludes the set of BM RS resources.

Aspect 24: The method of any of Aspects 20-23, wherein the first BM RS information is indicative of at least one BM RS parameter associated with the BM RS, and wherein the set of candidate resources is based on the at least one BM RS parameter.

Aspect 25: The method of Aspect 24, wherein the at least one BM RS parameter is indicative of a periodicity associated with the BM RS.

Aspect 26: The method of either of claim 24 or 25, wherein the at least one BM RS parameter is indicative of a quantity of resources to be used for transmitting the BM RS.

Aspect 27: The method of any of Aspects 24-26, wherein the at least one BM RS parameter is indicative of at least one of a priority, a resource selection window, or a resource set type.

Aspect 28: The method of any of Aspects 20-27, wherein the set of candidate resources is based on a reference signal received power (RSRP) threshold.

Aspect 29: The method of Aspect 28, wherein the RSRP threshold is associated with a beam failure detection configuration.

Aspect 30: The method of Aspect 19, wherein the first BM RS information indicates a set of candidate resources, wherein the set of BM RS resources is based on the set of candidate resources.

Aspect 31: The method of any of Aspects 19-30, wherein the IUC message comprises an IUC scheme 1 request.

Aspect 32: The method of Aspect 31, wherein the IUC scheme 1 request comprises a BM RS request indication.

Aspect 33: The method of any of aspects 31 or 32, wherein the IUC scheme 1 request comprises a BM RS identifier (ID).

Aspect 34: The method of any of Aspects 19-30, wherein the IUC message comprises an IUC information message.

Aspect 35: The method of Aspect 34, wherein the IUC information message comprises a BM RS request indication.

Aspect 36: The method of any of aspects 34 or 35, wherein the IUC information message comprises a BM RS identifier (ID).

Aspect 37: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-18.

Aspect 38: An apparatus for wireless communication at a device, the apparatus comprising one or more memories and one or more processors coupled to the one or more memories, the one or more processors configured to cause the device to perform the method of one or more of Aspects 1-18.

Aspect 39: An apparatus for wireless communication, the apparatus comprising at least one means for performing the method of one or more of Aspects 1-18.

Aspect 40: A non-transitory computer-readable medium storing code for wireless communication, the code comprising instructions executable by one or more processors to perform the method of one or more of Aspects 1-18.

Aspect 41: A non-transitory computer-readable medium storing a set of instructions for wireless communication, the set of instructions comprising one or more instructions that, when executed by one or more processors of a device, cause the device to perform the method of one or more of Aspects 1-18.

Aspect 42: A device for wireless communication, the device comprising a processing system that includes one or more processors and one or more memories coupled with the one or more processors, the processing system configured to cause the device to perform the method of one or more of Aspects 1-18.

Aspect 43: An apparatus for wireless communication at a device, the apparatus comprising one or more memories and one or more processors coupled to the one or more memories, the one or more processors individually or collectively configured to cause the device to perform the method of one or more of Aspects 1-18.

Aspect 44: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 19-36.

Aspect 45: An apparatus for wireless communication at a device, the apparatus comprising one or more memories and one or more processors coupled to the one or more memories, the one or more processors configured to cause the device to perform the method of one or more of Aspects 19-36.

Aspect 46: An apparatus for wireless communication, the apparatus comprising at least one means for performing the method of one or more of Aspects 19-36.

Aspect 47: A non-transitory computer-readable medium storing code for wireless communication, the code comprising instructions executable by one or more processors to perform the method of one or more of Aspects 19-36.

Aspect 48: A non-transitory computer-readable medium storing a set of instructions for wireless communication, the set of instructions comprising one or more instructions that, when executed by one or more processors of a device, cause the device to perform the method of one or more of Aspects 19-36.

Aspect 49: A device for wireless communication, the device comprising a processing system that includes one or more processors and one or more memories coupled with the one or more processors, the processing system configured to cause the device to perform the method of one or more of Aspects 19-36.

Aspect 50: An apparatus for wireless communication at a device, the apparatus comprising one or more memories and one or more processors coupled to the one or more memories, the one or more processors individually or collectively configured to cause the device to perform the method of one or more of Aspects 19-36.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single-or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:

one or more memories; and one or more processors, coupled to the one or more memories, configured to cause the first UE to:

communicate an inter-UE coordination (IUC) message with a second UE, the IUC message comprising first beam maintenance reference signal (BM RS) information, the first BM RS information comprising a set of candidate resources, wherein the first BM RS information is indicative of at least one BM RS parameter associated with the BM RS, and wherein the set of candidate resources is based on the at least one BM RS parameter; and transmit a BM RS using, based on the first BM RS information, a set of BM RS resources.

2. The first UE of claim 1, wherein the one or more processors are further configured to cause the first UE to receive second BM RS information indicating the set of candidate resources, wherein the set of BM RS resources is based on the set of candidate resources.

3. The first UE of claim 2, wherein the set of candidate resources includes the set of BM RS resources.

4. The first UE of claim 2, wherein the set of candidate resources excludes the set of BM RS resources.

5. The first UE of claim 1, wherein the at least one BM RS parameter is indicative of at least one of a periodicity associated with the BM RS, a quantity of resources to be used for transmitting the BM RS, a priority, a resource selection window, or a resource set type.

6. The first UE of claim 1, wherein the set of candidate resources is based on a reference signal received power (RSRP) threshold.

7. The first UE of claim 6, wherein the RSRP threshold is associated with a beam failure detection configuration.

8. The first UE of claim 1, wherein the first BM RS information indicates a set of candidate resources, wherein the set of BM RS resources is based on the set of candidate resources.

9. The first UE of claim 1, wherein the IUC message comprises an IUC scheme 1 request.

10. The first UE of claim 9, wherein the IUC scheme 1 request comprises at least one of a BM RS request indication or a BM RS identifier (ID).

11. The first UE of claim 1, wherein the IUC message comprises an IUC information message.

12. The first UE of claim 11, wherein the IUC information message comprises at least one of a BM RS request indication or a BM RS identifier (ID).

13. A second user equipment (UE) for wireless communication, comprising:

one or more memories; and one or more processors, coupled to the one or more memories, configured to cause the UE to:

communicate an inter-UE coordination (IUC) message with a first UE, the IUC message comprising first beam maintenance reference signal (BM RS) information, the first BM RS information comprising a set of candidate resources, wherein the first BM RS information is indicative of at least one BM RS parameter associated with the BM RS, and wherein the set of candidate resources is based on the at least one BM RS parameter; and receive a BM RS using, based on the first BM RS information, a set of BM RS resources.

14. The second UE of claim 13, wherein the one or more processors are further configured to cause the second UE to transmit second BM RS information indicating the set of candidate resources, wherein the set of BM RS resources is based on the set of candidate resources.

15. The second UE of claim 13, wherein the at least one BM RS parameter is indicative of at least one of a periodicity associated with the BM RS, a quantity of resources to be used for transmitting the BM RS, a priority, a resource selection window, or a resource set type.

16. The second UE of claim 13, wherein the set of candidate resources is based on a reference signal received power (RSRP) threshold.

17. The second UE of claim 16, wherein the RSRP threshold is associated with a beam failure detection configuration.

18. The second UE of claim 13, wherein the first BM RS information indicates a set of candidate resources, wherein the set of BM RS resources is based on the set of candidate resources.

19. The second UE of claim 13, wherein the IUC message comprises an IUC scheme 1 request.

20. The second UE of claim 19, wherein the IUC scheme 1 request comprises at least one of a BM RS request indication or a BM RS identifier (ID).

21. The second UE of claim 13, wherein the IUC message comprises an IUC information message.

22. The second UE of claim 21, wherein the IUC information message comprises at least one of a BM RS request indication or a BM RS identifier (ID).

23. A method of wireless communication performed by a first user equipment (UE), comprising:

communicating an inter-UE coordination (IUC) message with a second UE, the IUC message comprising first beam maintenance reference signal (BM RS) information, the first BM RS information comprising a set of candidate resources, wherein the first BM RS information is indicative of at least one BM RS parameter associated with the BM RS, and wherein the set of candidate resources is based on the at least one BM RS parameter; and transmitting a BM RS using, based on the first BM RS information, a set of BM RS resources.

24. The method of claim 23, further comprising:

receiving second BM RS information indicating the set of candidate resources, wherein the set of BM RS resources is based on the set of candidate resources, wherein the set of candidate resources excludes the set of BM RS resources.

25. The method of claim 23, wherein the at least one BM RS parameter is indicative of at least one of a periodicity associated with the BM RS, a quantity of resources to be used for transmitting the BM RS, a priority, a resource selection window, or a resource set type.

26. The method of claim 23, wherein the set of candidate resources is based on a reference signal received power (RSRP) threshold, and wherein the RSRP threshold is associated with a beam failure detection configuration.

27. A method of wireless communication performed by a second user equipment (UE), comprising:

communicating an inter-UE coordination (IUC) message with a first UE, the IUC message comprising first beam maintenance reference signal (BM RS) information, the first BM RS information comprising a set of candidate resources, wherein the first BM RS information is indicative of at least one BM RS parameter associated with the BM RS, and wherein the set of candidate resources is based on the at least one BM RS parameter; and receiving a BM RS using, based on the first BM RS information, a set of BM RS resources.

28. The method of claim 27, further comprising:

transmitting second BM RS information indicating the set of candidate resources, wherein the set of BM RS resources is based on the set of candidate resources, wherein the set of candidate resources excludes the set of BM RS resources.

29. The method of claim 27, wherein the at least one BM RS parameter is indicative of at least one of a periodicity associated with the BM RS, a quantity of resources to be used for transmitting the BM RS, a priority, a resource selection window, or a resource set type.

30. The method of claim 27, wherein the set of candidate resources is based on a reference signal received power (RSRP) threshold, and wherein the RSRP threshold is associated with a beam failure detection configuration.

* * * * *